(12) United States Patent
Mizutani et al.

(10) Patent No.: US 6,317,227 B1
(45) Date of Patent: Nov. 13, 2001

(54) HOLOGRAM

(75) Inventors: Yasuhiro Mizutani, Inabe-gun; Naoyuki Kawazoe, Hashima-gun; Hidekazu Hattori, Nagoya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/475,023

(22) Filed: Dec. 30, 1999

Related U.S. Application Data

(62) Division of application No. 09/100,491, filed on Jun. 22, 1998, now Pat. No. 6,075,626.

(30) Foreign Application Priority Data

Jun. 25, 1997 (JP) .................................................. 9-185879

(51) Int. Cl.[7] .................................................. G02B 5/32
(52) U.S. Cl. ................................ 359/15; 359/1; 359/13
(58) Field of Search ........................................ 359/1, 3, 15

(56) References Cited

U.S. PATENT DOCUMENTS

| 4,908,285 | 3/1990 | Kushibiki et al. | ........................ 359/3 |
|---|---|---|---|
| 5,270,120 | * 12/1993 | Andrews et al. | ..................... 428/507 |
| 5,731,060 | 3/1998 | Hirukawa et al. | ..................... 428/195 |

FOREIGN PATENT DOCUMENTS

| 57-6878 | 1/1982 | (JP) . |
|---|---|---|
| 64-40882 | 2/1989 | (JP) . |
| 5-203812 | 8/1993 | (JP) . |
| 3-157684 | 3/1994 | (JP) . |
| 6-56484 | 3/1994 | (JP) . |
| 7-315893 | 12/1995 | (JP) . |

* cited by examiner

Primary Examiner—Darren Schuberg
(74) Attorney, Agent, or Firm—Pillsbury Winthrop LLP

(57) ABSTRACT

A hologram has a hologram element 3 containing a photopolymer and a cover film 22 and cover plate 21 which cover its surfaces. An adhesive 1 is used for bonding the cover film to the hologram element and the cover plate to the hologram element. The hologram has excellent humidity resistance, chemical resistance, solvent resistance and heat resistance, prevents coloration, can maintain its holographic properties and allows easy repositioning of the hologram element.

6 Claims, 6 Drawing Sheets

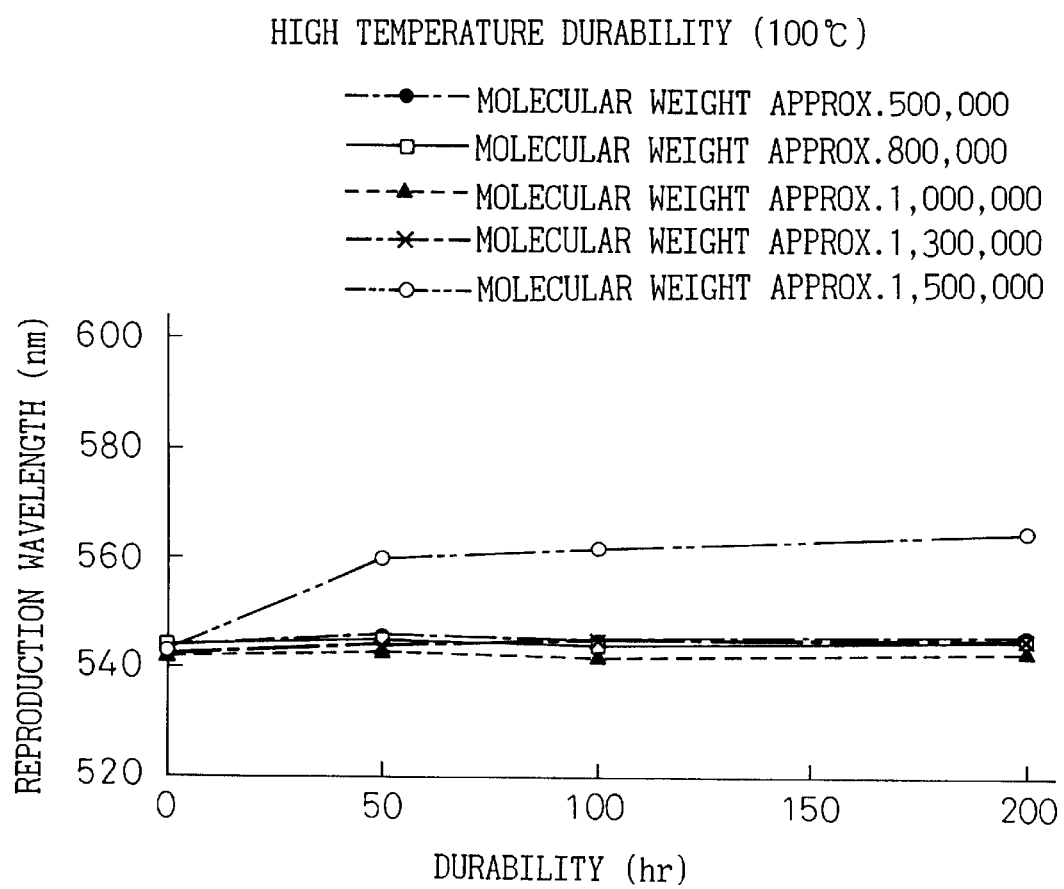

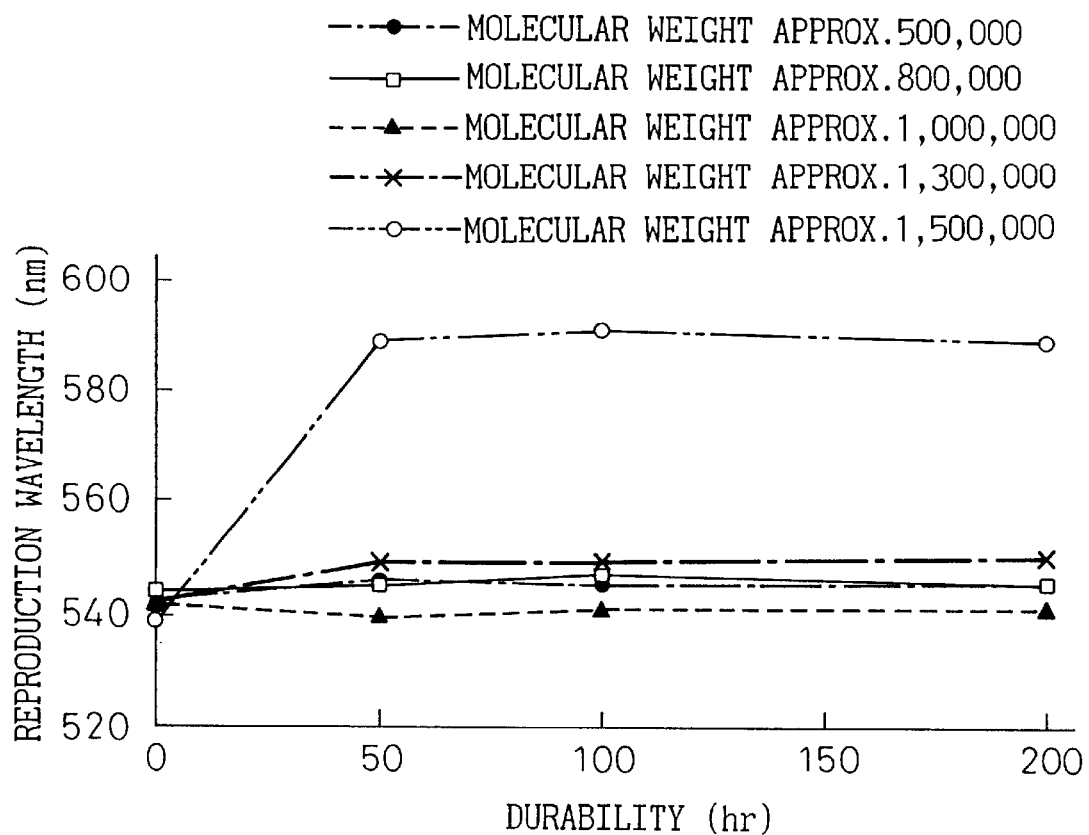

HOLOGRAM

This is a division of application Ser. No. 09/100,491, now U.S. Pat. No. 6,752,626 filed Jun. 22, 1998.

BACKGROUND OF THE INVENTION

1. Field of the Invention

The present invention relates to a hologram and, particularly, it relates to the adhesion between a hologram element and its cover film.

2. Description of the Related Art

Gelatin dichromate and photopolymers have conventionally been used as photosensitive materials for hologram elements.

Hologram elements made of gelatin dichromate have high diffraction efficiency and produce bright reproduction images. They also have a problem of susceptibility to moisture absorption which leads to changes in the hologram properties.

Also, while hologram elements made of photopolymers are moisture-resistant, they also have problems of poor solvent resistance and chemical resistance. For this reason, they have had poor quality reliability in high temperature environments and high temperature, high moisture environments.

Thus, according to the prior art it has been necessary to protect hologram elements from their environments.

In conventional use of hologram elements made of gelatin dichromate, the first means of protecting the hologram element was to cover the surface of the hologram element with a glass plate, and the second means was to produce the hologram element in an ultra-low humidity environment (dew point of −20° C. or below).

Also, in conventional use of hologram elements made of photopolymers, the first means has been to provide an inorganic layer on the plate surface, to prevent migration of water-soluble solvents into the hologram element caused by penetration of moisture passing through the plate to the hologram element from the plate surface (Japanese Unexamined Patent Publication No. 64-40882).

A second means has also been proposed whereby the hologram element is attached to a plate using an adhesive (Japanese Unexamined Patent Publication No. 5-203812). Such optical adhesives employ special materials to maintain the properties of the hologram element. As optical adhesives of such type there have been proposed, for example, adhesives containing no plasticizers (Japanese Unexamined Patent Publication No. 6-56484) and adhesives comprising polyfunctional acrylates and polymerization initiators (Japanese Unexamined Patent Publication No. 3-157684).

However, the following problems have been associated with the conventional means for protecting hologram elements.

First, with the above-mentioned first means for using hologram elements made of gelatin dichromate, the use of glass plates has been an obstacle to weight reduction of the hologram elements, while their possible uses have been limited because of the reduced degree of design freedom, since the shape must be flat.

With the second means, production under ultralow humidity conditions has resulted in poor manageability.

The first means for using hologram elements made of photopolymers is limited to cases where the hologram element is a polyvinyl carbazole system, because when other photopolymers are used certain problems occur such as changes in the properties of the hologram caused by solvents or chemicals, discoloration of the hologram element, and inferior durability.

Also, with the second means, there has been a problem in that air bubbles become included in the adhesive during adhesion of the hologram element, thus altering the optical properties of the hologram element. Here, addition of an antifoaming agent to the adhesive has been considered as an option. However, although this allows absorption of relatively small air bubbles, the larger air bubbles which are produced during attachment cannot be absorbed.

In addition, after application of the adhesive to the hologram element and attachment to the plate, the adhesive often bleeds out from between them. For this reason, a step has been necessary for wiping off the adhesive which bleeds out.

Also, when the positions of the hologram element and the plate become shifted and they are then attached with the adhesive, the hologram element and plate become fixed with the adhesive, making it impossible to reposition them afterwards.

SUMMARY OF THE INVENTION

In light of these problems of the prior art, it is an object of the present invention to provide a hologram which has excellent humidity resistance, chemical resistance, solvent resistance and heat resistance, which can prevent discoloration while retaining the properties of the hologram, and which allows easy repositioning of the hologram element.

The present invention, therefore, provides a hologram comprising a hologram element containing a photopolymer and at least one cover film covering one or both sides of the hologram element, wherein the hologram element and the cover film are bonded with an adhesive.

BRIEF DESCRIPTION OF THE DRAWINGS

FIG. 10 is a graph showing the results from a high temperature durability test with a hologram according to Example 3.

FIG. 11 is a graph showing the results from a high humidity high temperature durability test with a hologram according to Example 4.

DESCRIPTION OF THE PREFERRED EMBODIMENTS

Figure 1:
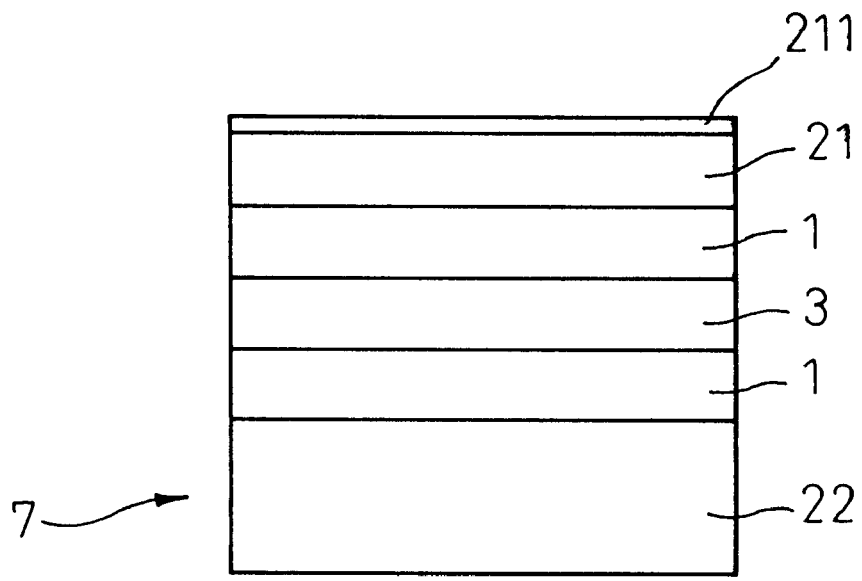
FIG. 1 is a cross-sectional view of the hologram of Example 1.

Most notable among the aspects of the invention is that the hologram element and cover film are bonded using an adhesive.

The adhesive is a material which is normally in a softened state, with no fluidity and having tackiness (adhesive property). The adhesive is capable of binding the hologram element and cover film because of its adhesive property.

Also, since the adhesive has no fluidity, it does not bleed out from between the hologram element and cover film even when pressure force is applied to the adhesive between the hologram element and cover film. Consequently, manageability is improved because no operation is required for removal of adhesive which has bled out.

Furthermore, since the adhesive is not normally hardened, even when the position of the hologram element is shifted with respect to the cover film when bonded thereto, the hologram element and cover film can easily be repositioned thereafter.

The weight average molecular weight (hereunder referred to as "molecular weight") of the adhesive is preferably from 800,000 to 1,300,000. This makes it possible to prevent migration of the components of one of the hologram element and the cover film to the other by way of the adhesive in high temperature atmospheres or high temperature, high humidity atmospheres. That is, adhesives with the molecular weight specified above can ensure that components often included in hologram elements and cover films, such as plasticizers, oligomers, etc. are retained in the hologram elements and cover films.

Thus, the adhesive serves as a barrier for these components, preventing migration of the components from one side to the other side. There is no risk, consequently, of the components of the hologram element and the cover film mixing. It is therefore possible to maintain the holographic properties of the hologram element. Since the crosslinking density between the molecules is higher when the molecular weight of the adhesive is lower, adhesives with lower molecular weights provide a strong barrier property as adhesives.

However, when the molecular weight of the adhesive is less than 800,000, so that the adhesive provides a high barrier property against migration of the components, the adhesive strength of the adhesive is reduced, thus lowering the bonding strength between the hologram element and the cover film, and presenting a risk of lower durability of the hologram as a result of loosening of the cover film in high temperature, high humidity environments. Also, if the molecular weight of the adhesive exceeds 1,300,000, the crosslinking density of the adhesive is reduced, leading to more penetration of the cover film components such as plasticizers and oligomers through the adhesive, and often causing variation and deterioration of the holographic properties as these components migrate into the hologram element.

As an effect of this migration on the holographic property, the hologram element will swell when migration from the cover film to the hologram element is extensive. Consequently, for reflective holograms, the reproductive wavelength shifts to the long wavelength side due to an increased width of the interference band.

For transmission holograms, the width of the interference band changes, thus altering the direction of diffraction.

Conversely, if migration from the hologram element to the cover film is extensive, the hologram element will contract. Thus, in the case of reflective holograms the reproductive wavelength shifts toward the short wavelength end. For transmission holograms, the direction of diffraction is altered to the opposite end from that of the swelling mentioned above.

The direction of swelling and contraction due to migration of components of the cover film and hologram is determined by the type of cover film.

The adhesive is preferably modified so as to absorb acid components. It is thus possible to prevent mutual migration of the acid components, since the adhesive absorbs any acid components which may be included in the cover film. As a result, it is possible prevent migration of acid components in the cover film into the hologram element and thus reduce coloration, such as yellowing, of the hologram element.

Specifically, it is preferred for the adhesive to have a functional group which can adsorb acid components. This will make it possible to reduce migration of the acid components and prevent coloration of the hologram element.

As examples, the adhesive preferably comprises one or more components selected from the group consisting of natural rubber, polyisoprene, styrene-butadiene rubber, butyl rubber, polyisobutylene, butyl polyacrylate, 2-ethylhexyl polyacrylate, polyacrylic acid, silicone rubber and polyvinyl butyl ether. Using these can more effectively prevent migration of the components of the hologram element and cover film.

The cover film is preferably of one or more types selected from the group consisting of polyethylene terephthalate, triacetyl cellulose, acryl and urethane. These can serve as a barrier against moisture for the hologram, while also providing a lightweight hologram. These cover films also often contain components such as plasticizers and oligomers which can alter the properties and color of the hologram element. According to the invention, using the adhesive described above can reduce migration of these components to the hologram element, maintain the hologram properties and prevent coloration.

The cover film may be in the form of a panel or a membrane.

The adhesive described above may be applied to any desired portion of the cover film, on the side facing the hologram element and on the surface of the opposite side. Thus, bonding can be achieved with the hologram in a manner which allows repositioning with respect to the support member.

The hologram is preferably a hologram combiner, which transmits external light to produce a visible image for the viewer while also diffracting a signal beam containing display data to produce visible diffracted light for the viewer. Such hologram combiners may be either reflective or transmission types, and they may be used, for example, in head-up displays for vehicles such as automobiles and trains, and various types of display devices used at service counters and the like.

The hologram may also preferably be a hologram screen. Specifically, a hologram screen records a diffusion panel (diffuser panel) in the hologram, and forms a display image by irradiating specific light from an image forming device. This allows the display image to be displayed on the hologram screen within a wide visible area. The hologram screen may be provided on a construction window, glass door, transparent partition, showcase or vehicle window.

The hologram may also be a hologram for a head-up display. The hologram combiner and hologram screen mentioned above can also be used as a head-up display. Because the adhesive has excellent heat resistance, moisture resistance, durability and weather resistance, the hologram property can be maintained while coloration of the hologram is reduced, even under the extreme conditions outdoors or in vehicles.

The present invention will now be explained further by way of examples.

Example 1

A hologram according to an embodiment of the invention will now be explained with reference to FIGS. 1 to 8.

The hologram 7 of this embodiment, as shown in FIG. 1, comprises a hologram element 3 containing a photopolymer, a cover film 21 covering the top side of the hologram element 3 and a cover plate 22 covering the bottom side of the hologram element 3. The hologram element 3 and cover film 21 and the hologram element 3 and cover plate 22 are bonded together with an adhesive 1 consisting of an acrylic resin of molecular weight of 1,000,000.

The method of producing the hologram will now be explained.

Figure 2:
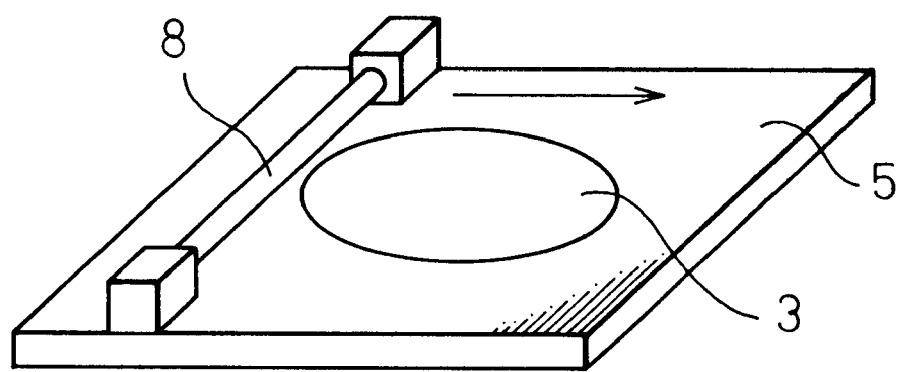
FIG. 2 is an illustration showing a method of forming hologram element according to Example 1.

First, as shown in FIG. 2, an applicator 8 is used to coat a glass substrate 5 with a photopolymer composition to a dry film thickness of 20–40 $\mu$m to form the hologram 3. Other methods include spin coating, dipping and bar coating methods.

Next, heat treatment is carried out for about 30 minutes at a temperature of around 100° C. volatilize and remove the solvent in the hologram element 3. Next, as shown in FIG. 3, a TAC film 51 is laminated on the hologram element 3 to prevent damage and adhesion of dirt during the production process, to make a photographic plate 6.

A glass plate 66 with an anti-reflection film 65 is positioned on the photographic plate 6.

Figure 3:
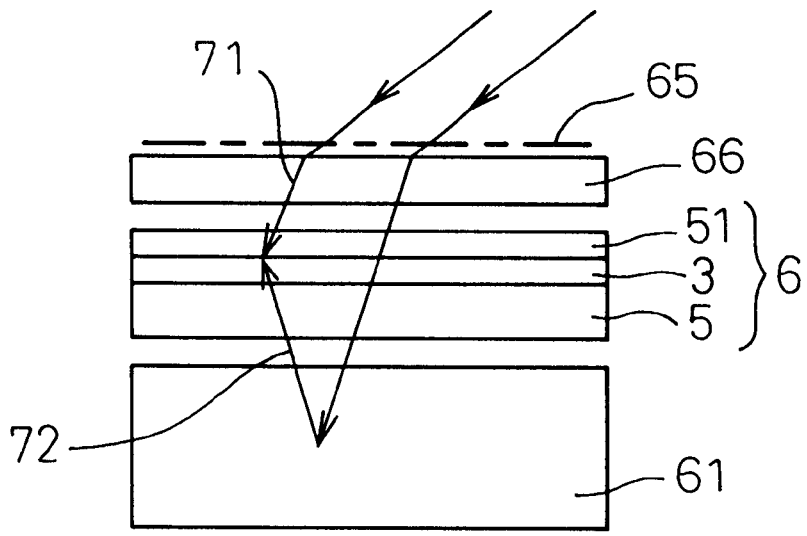
FIG. 3 is an illustration showing a method of hologram recording with a hologram element according to Example 1.

Next, as shown in FIG. 3, one of the sides of the photographic plate 6 was attached with silicone oil to one side of a master hologram 61 having the desired lens shape recorded thereon, and the other side of the photographic plate 6 was irradiated with argon laser light of 514 nm wavelength. The exposure intensity was 10–100 mJ/cm$^2$.

Interference occurs between the incident light 71 and the diffracted light 72 created when the incident light 71 passes through the photographic plate and is diffracted and reflected at the master hologram 61, and polymerization of the first monomer of the photopolymer composition results in recording of an interference band in the hologram element 3 of the photographic plate 6, thus recording a reflective Lippmann hologram.

Figure 4:
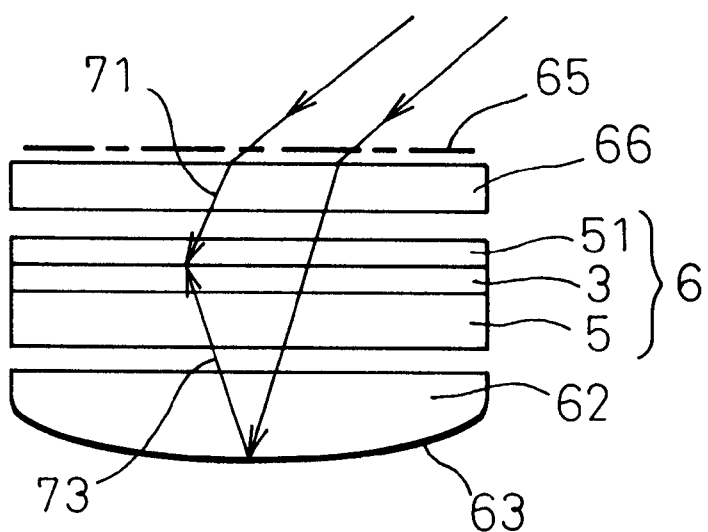
FIG. 4 is an illustration showing another method of hologram recording with a hologram element according to Example 1.

As another method of recording a reflective hologram, instead of the flat master hologram 61 shown in FIG. 3, the method shown in FIG. 4 may be employed which uses an optical element provided with a reflective film 63 produced by aluminum vapor deposition, etc. on a transparent optical member 62 which is convex (or concave) on one side. In this case, interference between the incident light 71 and the reflected light 73 at the reflective film 63 causes an interference band to be recorded in the hologram element 3. The convex (or concave) transparent optical member 62 may be non-spherical, for example parabolic or hyperbolic, or it may have a spherical shape. An interference band can also be recorded by double beam photography with irradiation of argon laser light on both sides of the photographic plate, without using a master hologram or the optical element.

Next, irradiation with ultraviolet light (1–30 J/cm$^2$) is used for polymerization of the second monomer of the photopolymer composition, to thus accomplish development and provide the holographic properties to the hologram element 3.

Figure 5:
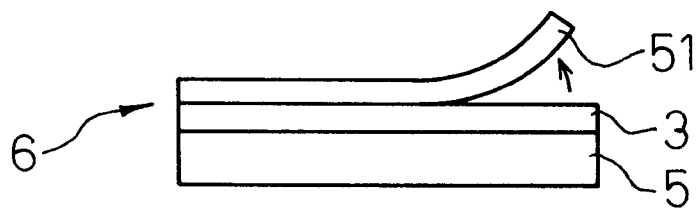
FIG. 5 is an illustration showing a method of producing a hologram from a photographic plate according to Example 1.
Figure 6:
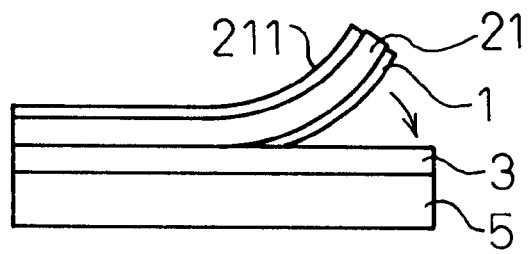
FIG. 6 is an illustration showing a method of producing a hologram after FIG. 5.

Next, as shown in FIG. 5, the TAC film 51 is released from the surface of the hologram element 3. Then, as shown in FIG. 6, a cover film 21 is attached to the surface of the hologram element 3 via an adhesive consisting of an acrylic resin of molecular weight 1,000,000, and a pressure of at least 1×10$^5$ Pa is applied thereto. The cover film 21 used may be a TAC film which has been surface coated with an anti-reflection film 211.

If the pressure applied for attachment to the hologram element 3 is less than 1×10$^5$ Pa, there will be a risk of creating microbubbles of about 10–100 $\mu$m at the attachment interface. The microbubbles swell when left in a high temperature atmosphere (around 100° C.), and combine to grow into bubbles of about a few millimeters which can be seen with the naked eye, and which cause considerable impairment of the function and durability of the optical element of the hologram.

The hologram is then subjected to heat aging (about 120° C., 4 hours). This is to improve the diffraction properties and heat resistance of the hologram.

Figure 7:
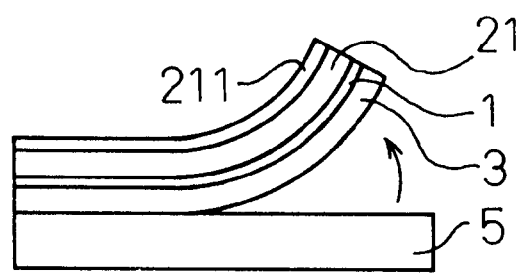
FIG. 7 is an illustration showing a method of producing a hologram after FIG. 6.

Next, as shown in FIG. 7, the cover film 21 attached to the hologram element 3 is pulled off together with the hologram element 3 to release these from the glass substrate 5.

Figure 8:
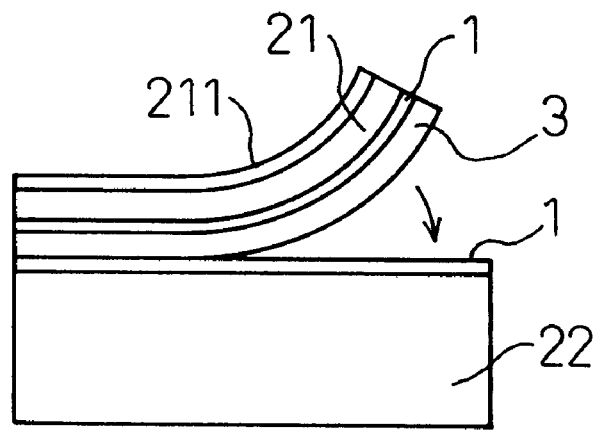
FIG. 8 is an illustration showing a method of producing a hologram after FIG. 7.

Then, as shown in FIG. 8, the surface of the cover plate 22 consisting of a heat resistance acrylic panel is coated with an adhesive 1 made of an acrylic resin (molecular weight 1,000,000), and the hologram element 3 is attached to the surface thereof prior to applying pressure of at least 1×10$^5$ Pa. A hologram 7 as shown in FIG. 1 is thus obtained.

Incidentally, the cover plate 22 is subjected to heat treatment (100° C.–110° C., 5 hours) in advance to remove moisture absorbed by the cover plate 22. If no heat treatment is performed, the moisture absorbed by the cover plate 22 will evaporate when the hologram is exposed to a high temperature atmosphere of about 100° C., which can result in retention of the water vapor at the interface between the cover plate 22 and the adhesive 1, thus leading to creation of air bubbles at the interface between the adhesive 1 and the cover plate 22 and loosening of the cover film 21. The heat treatment of the cover plate 22 can prevent such loosening of cover films. The heat treatment of the cover plate 22 also has an annealing effect. When the cover plate 22 consists of an acrylic resin, the heat deformation temperature increases from about 100° C. to about 115° C.

The reproduction wavelength shift of the resulting hologram 7 was 3 nm, without coloration and thus with no reduction in diffraction efficiency, even when the hologram was allowed to stand for 1000 hours in both a high temperature environment of 100° C. and a high temperature, high humidity environment of 65° C., 95% RH. There was also no loosening of the cover film.

Example 2

Figure 9:
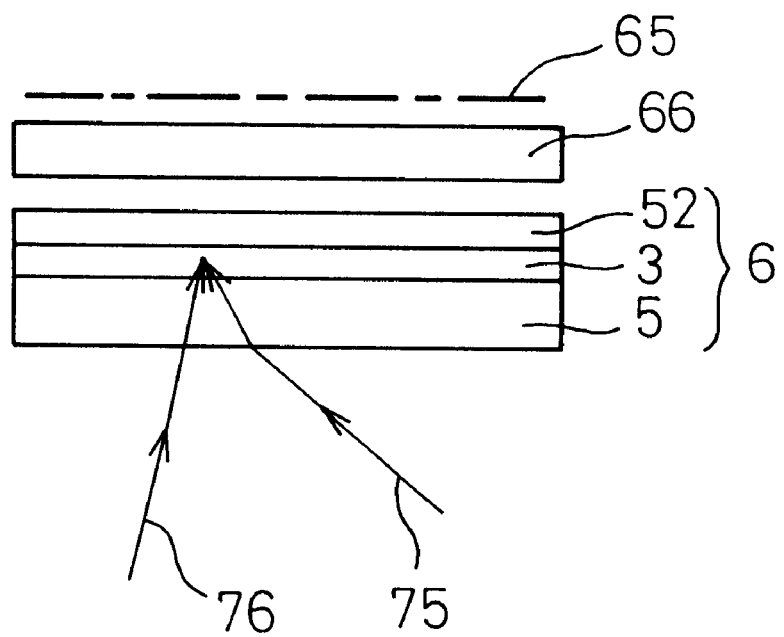
FIG. 9 is an illustration showing a method of recording an interference band with a hologram element according Example 2.

This example, as shown in FIG. 9, had a structure wherein one side of the hologram element 3 was coated with a PET film 52 made of polyethylene terephthalate for recording the interference bands on the hologram element, while the other side was attached to a glass substrate 5. The hologram element 3 used was a photopolymer composition of the same material as in Example 1.

Specifically, the hologram element 3 used was one with a film structure coated on both sides with a PET film. For recording of the interference band, the PET film on one side of the hologram element 3 was released, while the other side was attached to the glass substrate 5 by the tackiness (adhesion) of the hologram element 3, to prepare a photographic plate 6.

A glass plate 66 with an anti-reflection film 65 was positioned on the photographic plate 6.

Next, argon laser light beams 75, 76 were irradiated from the same side of the photographic plate 6 for polymerization of the first monomer of the photopolymer composition, to record a transmission Fresnel hologram. The exposure intensity was 10–50 mJ/cm$^2$.

Subsequent irradiation with ultraviolet light (1–30 mJ/cm$^2$) was used for polymerization of the second monomer of the photopolymer composition to develop the hologram element. This resulted in formation of interference bands in the hologram element 3 to give it a diffracting property.

The resulting transmission hologram element is then attached to the cover plate and cover film with an adhesive in the same manner as in Example 1, to prepare the hologram. The adhesive used to form the hologram was an acrylic resin of molecular weight 1,000,000, as in Example 1.

The diffraction direction of the hologram of this example was within ±1° and there was no coloration of the hologram element, even when the hologram was allowed to stand for 1000 hours in both a high temperature environment of 100° C. and a high temperature, high humidity environment of 65° C., 95%. There was also no loosening of the cover film.

Coloration of the hologram element occurs if the adhesive is not modified to absorb acid components, and modification of the adhesive is especially important with transmission types because their diffraction efficiency is considerably reduced by coloration.

The hologram of this example underwent no such change in the diffraction efficiency, and no coloration occurred. It therefore exhibited excellent holographic properties.

Example 3

In this example, as shown in FIG. 10, the effect of changes in the molecular weight of the adhesive on the durability of holograms at high temperature (high temperature durability) was investigated.

The molecular weight of the adhesive was varied from 500,000 to 1,500,000. The holograms were otherwise produced in the same manner as in Example 1.

Each hologram was placed in a high temperature environment of 100° C. and the change in the reproduction wavelength was measured periodically. The results are shown in FIG. 10.

As seen in this drawing, the holograms having adhesives of molecular weight 1,300,000 and lower exhibited no change in the reproduction wavelength even when allowed to stand for 200 hours and longer, thus demonstrating their excellent durability.

Example 4

In this example, as shown in FIG. 11, the effect of changes in the molecular weight of the adhesive on the durability of holograms at high temperature and high humidity (high temperature/high humidity durability) was investigated.

The molecular weight of the adhesive was varied from 500,000 to 1,500,000. The holograms were otherwise produced in the same manner as in Example 1.

Each hologram was placed in a high temperature, high humidity environment of 65° C., 95% RH and the change in the reproduction wavelength was measured periodically. The results are shown in FIG. 11.

As seen in this drawing, the holograms having adhesives of molecular weight 1,300,000 and lower exhibited no change in the reproduction wavelength even when allowed to stand for 200 hours and longer, thus demonstrating their excellent durability.

What is claimed is:

1. A hologram comprising a hologram element containing a photopolymer and at least one film covering one or both sides of said hologram element, wherein the hologram element and the cover film are bonded with an adhesive containing a component which absorbs an acid component.

2. A hologram according to claim 1, wherein said adhesive has a functional group which is capable of absorbing an acid component.

3. A hologram according to claim 1, wherein said adhesive comprises at least one selected from the group consisting of natural rubber, polyisoprene, styrene-butadiene rubber, butyl rubber, polyisobutylene, butyl polyacrylate, 2-ethylhexyl polyacrylate, polyacrylic acid, silicone rubber and polyvinyl butyl ether.

4. A hologram according to claim 1, wherein said cover film comprises at least one selected from the group consisting of polyethylene terephthalate, triacetyl cellulose, acryl and urethane films.

5. A hologram according to claim 1, wherein said hologram is a hologram combiner which transmits external light to produce a visible image for the viewer while also diffracting a signal beam containing display data to produce visible diffracted light for the viewer.

6. A hologram according to claim 1, wherein said hologram is a hologram screen.

* * * * *